US006575466B1

United States Patent
Lizak (12)

(10) Patent No.: US 6,575,466 B1
(45) Date of Patent: Jun. 10, 2003

(54) GAME OF CHANCE

(76) Inventor: Jerzy J. Lizak, 11028-36th Ave. SE., Everett, WA (US) 98208

( * ) Notice: Subject to any disclaimer, the term of this patent is extended or adjusted under 35 U.S.C. 154(b) by 0 days.

(21) Appl. No.: 09/922,514

(22) Filed: Aug. 3, 2001

Related U.S. Application Data

(60) Provisional application No. 60/295,269, filed on Jun. 1, 2001.

(51) Int. Cl.[7] .................................................. A63F 1/00
(52) U.S. Cl. .......................... 273/292; 273/274; 463/13
(58) Field of Search ................................ 273/292, 274; 463/11–13

(56) References Cited

U.S. PATENT DOCUMENTS

| 5,275,415 | A |   | 1/1994 | Wisted |  |
|---|---|---|---|---|---|
| 5,282,633 | A |   | 2/1994 | Boylan et al. |  |
| 5,314,193 | A |   | 5/1994 | Ferrer |  |
| 5,374,067 | A | * | 12/1994 | Jones | 273/292 |
| 5,613,682 | A |   | 3/1997 | Otuzbiryan |  |
| 6,027,119 | A |   | 2/2000 | De Lisle |  |
| 6,170,823 | B1 | * | 1/2001 | Kintner | 273/236 |
| 6,203,018 | B1 | * | 3/2001 | Osuch | 273/292 |
| 6,247,697 | B1 | * | 6/2001 | Jewett | 273/292 |

\* cited by examiner

*Primary Examiner*—Benjamin H. Layno
*Assistant Examiner*—V K Mendiratta
(74) *Attorney, Agent, or Firm*—Michael R. Schacht; Schacht Law Office, Inc.

(57) ABSTRACT

A game of chance. A plurality of representations of cards comprising Aces, Kings, Queens, Jacks, and at least one number card are provided. Each representation of a card has subordinate characteristics consisting of suits and face values. A point value is assigned to each representation of a card such that Aces are assigned the highest point value. Minimum requirements are established for adding the point values of representations of cards based on the at least a selected one of the subordinate characteristics. A set of four representations of cards are randomly distributed to at least one player. A total value for the set is then calculated by summing the point values of the representations of cards in the set meeting the minimum requirements. The total value includes the sum of up to and including four of the representations of cards in the set. Whether the at least one player wins is determined based on the total value of the set.

7 Claims, 2 Drawing Sheets

GAME OF CHANCE

RELATED APPLICATIONS

This application claims priority of U.S. Provisional Patent Application Ser. No. 60/295,269, which was filed on Jun. 1, 2001.

BACKGROUND OF THE INVENTION

The present invention relates to games of chance. A game of chance employs an element of randomness, often in combination with knowledge or skill. The randomness is often introduced by shuffled cards, rolled dice, or machinery. The knowledge and skill arise from the player's knowledge of the rules, choices or selections made by the player, and the player's skill at "reading" the other players while not giving away the strength of the player's own hand.

The present invention will perhaps most commonly be implemented with playing cards and will be described herein primarily in the context of a card game. The present invention may be implemented in forms other than a card game; the present application will thus discuss alternative implementations of the present invention such as a dice game, a computer game, video game, or slot machine game.

Games of chance are typically played in many environments, for different reasons, and in many different physical or graphical forms. For example, games of chance are often played in private settings, tournament settings, and in casinos. Players often play games of chance for recreation or entertainment purposes through pure competition without wagering, or, with wagering, as part of a gambling activity. In addition, games of chance may be physically implemented or represented using physical objects such as playing cards or dice and/or as a mechanized and/or computerized system. Often, games of chance evolve into numerous variations implementing a set of basic rules.

One example of a popular, and typical, game of chance is Poker. Poker may be played privately with our without wagering or in a casino setting, usually with wagering. Poker rules may be implemented using playing cards, with dice using a modified set of rules (as in the game "Yahtzee"), and/or as a computer game that creates images depicting cards or dice. Also, Poker employs a basic set of rules but can be played in a number of different variations. These variations include, for example, the use of wild cards, the number of cards used, whether cards can be discarded and new cards drawn, whether aces are high or low, and/or the manner in which the cards are dealt (all face down or some face down and some face up).

The ultimate goal of games of chance is usually recreation, even when wagering is involved. Players can, however, become bored with a given game, with the result being that the player plays the game less. This is a particular problem with casinos and card rooms that derive revenue off of the game of chance. Whether played for pure competition or during gambling, the need thus exists for new games of chance that are new and exciting and provide entertainment and recreation for the players.

RELATED ART

The following references were uncovered during a professional patentability search conducted on behalf of the Applicant:

U.S. Pat. No. 5,613,682 to Otuzbiryan discloses a card game in which in which Kings, Queens, and Jacks count as ten points, Aces count as eleven points, and number cards have a point value equal to their face value. Four cards are dealt, but one card is discarded resulting in a three card hand. The point values of the cards are changed to eleven if the hand contains three cards having the same face value. The point values are summed to obtain a total value for the hand. If numerical values of the hands are the same, the face values are compared to determine a winner. The hands have no minimum requirements, and it is not possible to obtain a zero. However, the point values of cards are summed only if the cards are of the same suit or if three cards in the hand have the same face value. The deck includes a Joker that has a value of eleven or can be used as a face or numbered card in any suit.

U.S. Pat. No. 6,027,119 to De Lisle discloses a card game in which Kings, Queens, and Jacks count as ten points, Aces count as eleven points, and number cards have a point value equal to their face value. Five cards are dealt to each player, and a total value of the hand is computed as the sum of the cards in a given suit. The player wins if the players point value exceeds the dealer's point value or if the dealer's point value fails to equal a predetermined value.

U.S. Pat. No. 5,314,193 discloses a card game in which number cards are assigned a point value equal to their face value, with the Ace equaling one, and face cards and wild cards are assigned a value of one-half. The highest score is ten and one-half. Each player is dealt a two-card hand and can stand pat or can draw up to two more cards. All hands with a total value ending in one-half beats a hand with a total value that is an integer.

U.S. Pat. No. 5,282,633 to Boylan et al. discloses a card game played with number cards having a numerical value and assigned to one of two suits and no-value cards having no numerical value or suit. The total of a hand equals a net total equal to the total of the added numerical values of cards of one suit less the added numerical values of cards of the other suit. The net totals of the hands are compared to determine which net total is closest to a predetermined winning total without exceeding the winning total.

U.S. Pat. No. 5,275,415 to Wisted discloses a card game in which the numerical values of cards are added to reach a predetermined unique point total of twenty-two points or near thereto. The values of cards are added in a manner similar to Blackjack but are dealt in a different manner.

SUMMARY OF THE INVENTION

The present invention is a game of chance. A plurality of representations of cards comprising Aces, Kings, Queens, Jacks, and at least one number card are provided. Each representation of a card has subordinate characteristics consisting of suits and face values. A point value is assigned to each representation of a card such that Aces are assigned the highest point value. Minimum requirements are established for adding the point values of representations of cards based on the at least a selected one of the subordinate characteristics. A set of four representations of cards are randomly distributed to at least one player. A total value for the set is then calculated by summing the point values of the representations of cards in the set meeting the minimum requirements. The total value includes the sum of up to and including four of the representations of cards in the set. Whether the at least one player wins is determined based on the total value of the set.

DETAILED DESCRIPTION

Figure 1:
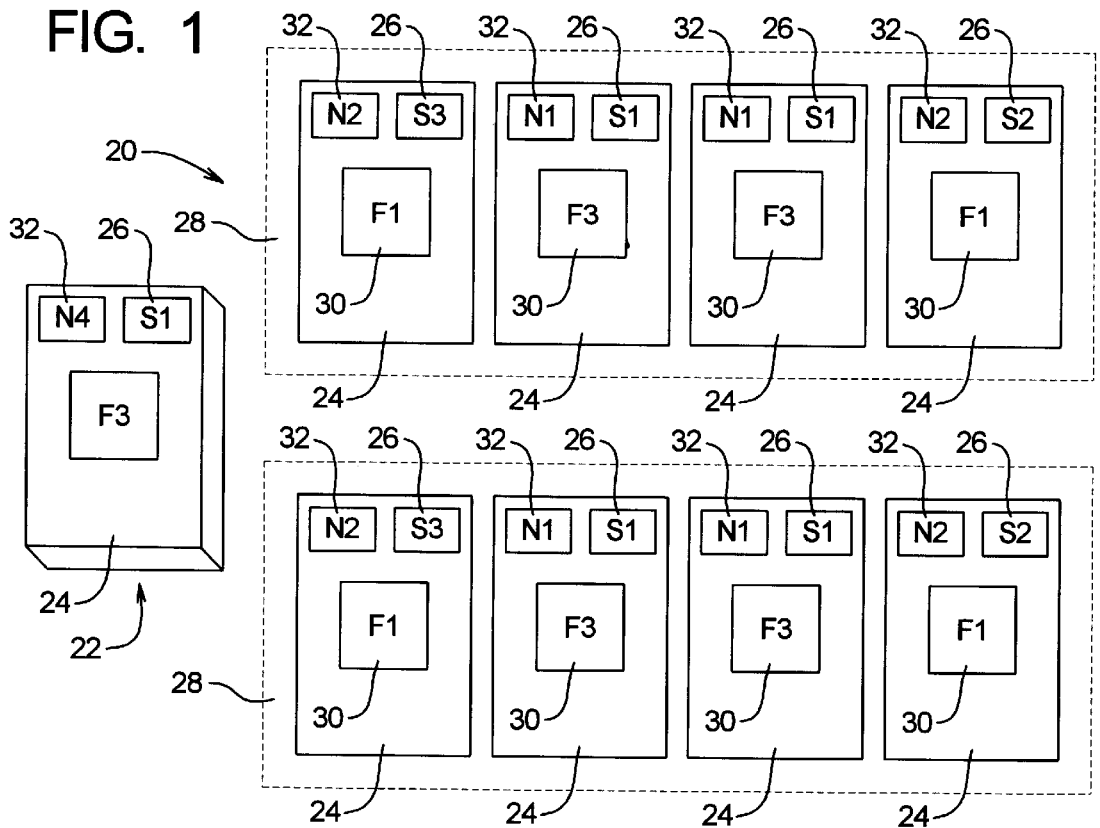
FIG. 1 is a somewhat schematic view depicting one physical structure for implementing the methods of the present invention.

The present invention is a game of chance employing a basic set of rules that may be implemented in numerous physical or electronic forms, in numerous settings, and in numerous variations. The following discussion will contain a general discussion of the basic rules and several typical implementations of games constructed in accordance with, and embodying, the principles of the present invention. Numerous implementations of the present invention will then be described in further detail.

I. Basic Rules

A game of chance implementing the principles of the present invention will follow certain basic rules that will be recognizable regardless of the specific manner in which the game is implemented. This section describes certain rules that are associated with this game in most if not all of its forms. In the following discussion, rules that are not necessary to implement the game of the present invention in its broadest form are stated in the form of a step that "may be" performed.

Initially, a plurality of representations of cards are provided. Each representation of a card is assigned a point value. The representations of cards are further assigned at least one subordinate characteristic such as an assigned face value (e.g., Ace, King, Nine, etc.) and/or suit (e.g., Hearts, Diamonds, etc.). A hierarchy within the at least one subordinate characteristic may be defined. When a plurality of subordinate characteristics is used, a hierarchy between the subordinate characteristics may also be defined.

The representations of cards are distributed to or associated with one or more players in sets or hands containing four representations of cards. The winning set is determined by a total value calculated based on the sum of the point values of between one and four of the representations of cards within the set. Minimum requirements are defined for determining whether the point values of representations of cards within a set are included within the total value of that set. The minimum requirements are based on at least one subordinate characteristic.

In the case of numerical ties, the hierarchies within the at least one subordinate characteristic of the representations of cards may be considered.

Groups of players may compete with each other by comparing the total value of their respective sets of representations of cards for each hand, while an individual player can play alone by comparing his or her set total value against one or more predetermined ranges of total values. Scores can be calculated by generating an accumulated total by summing together the total values of successive hands in either a group or individual setting.

II. Typical Implementations

The present invention may be implemented as a game using any type of representation of a card that allows the basic rules described above to be carried out. The present invention is most easily implemented using at least a portion of a conventional playing cards, although these cards may be configured as a deck of cards having fewer or greater than fifty-two cards. The present invention will thus be described below primarily in the context of conventional playing cards. One of ordinary skill in the art will recognize, however, that a game that falls within the scope of the present invention may be developed using representations of cards other than conventional playing cards.

A. Card Game

The present invention may be implemented using representations of cards formed by playing cards of any type. Referring now to FIG. 1, in one exemplary form a game 20 the present invention is implemented using a deck 22 of representations of cards formed by playing cards 24. The number of cards 24 in the deck 22 typically, but not necessarily, relates to the number of players.

The deck 22 further defines a plurality of suits 26. Each card 24 is assigned one of the suits 26. The cards 24 are dealt to the players such that each player holds a hand 28 comprising a plurality of cards 24. Each of the cards 24 also defines a face value 30 and an assigned point value 32. The suits 26 and face values 30 form subordinate characteristics of the cards 24. Hierarchies of suits 26 and face values 30 may be established. Minimum requirements are established for determining the value of a hand 28.

The game winner is determined by total values calculated by adding the point values 32 of the cards 24 in each player's hand 28 meeting the minimum requirements. Generally, the point values 32 are ranked with the highest total value winning, although players can have hands 28 with the same total value.

Numerical ties may be broken based on the established hierarchies of subordinate characteristics. For example, the face values 30 of the cards 24 may break ties between equivalent numerical values. The rules may be established such that ties are either always prevented or, in some case, allowed. To prevent ties in all cases, the suits 26 may be ranked relative to each other such that one suit takes precedence over another when hands 28 having the same total value also comprise cards 24 having the same face value 30.

B. Automated Machine

Figure 2:
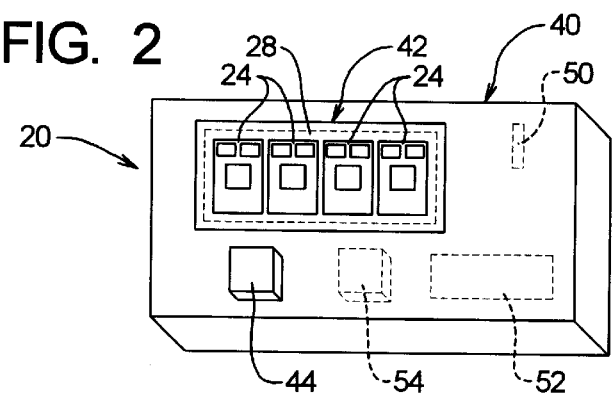
FIG. 2 is a perspective view depicting another physical structure for implementing the methods of the present invention.

In another exemplary form, in FIG. 2 the game 20 of the present invention is implemented using an automated machine 40 that graphically depicts the playing cards 24. Otherwise, when implemented using the machine 40, the game 20 is played in the same manner and according to the same rules described in the Basic Rules and/or Card Games sections above.

In one preferred embodiment, the machine 40 may be implemented using any device capable of depicting or representing in a viewing area 42 a hand 28 consisting of the cards 24, including suits 26, face values 30, and point value 32 of the cards 24. The machine 40 may be a mechanical device, electromechanical device, or electronic device. Typically, the machine 40 will be an electromechanical or video (electronic) slot machine that accepts and/or dispenses money, a computer, a console video game, or a handheld video game.

The machine 40 may comprise an initiate button 44 that, when pressed, generates a new hand 28. Multiple machines 40 may be connected to allow groups of players to compete against each other, or one machine 40 may be configured to allow group play with multiple physical or virtual viewing areas 42. The generation of a hand 28 using the machine 40 is considered distributing representations of cards within the context of the present application.

C. Dice Game

The game 20 may be implemented as a dice game. One exemplary dice game implementing the basic rules described above employs a plurality of dice have six or more sides, where each side forms a representation of a card and is assigned a point value and a subordinate characteristic such as a color. Preferably, four dice are used, each having six sides. The dice are rolled and allowed to come to rest such that four sides are facing up. The point values of the four sides facing up are added together to obtain a total value if certain minimum requirements are met, such as the sides of the dice facing up be of the same color.

Another dice embodiment of the present invention would be to provide eight dice arranged in pairs. One dice in each pair represents a point value, while the other dice in each pair represents a subordinate characteristic. The dice are rolled such that, when the dice come to a rest, each pair represents a point value and a subordinate characteristic. The total value is calculated based on the point values and subordinate characteristics of each pair.

One of ordinary skill in the art will recognize that numerous variations on and permutations of these basic dice game implementations are possible.

III. Implementations Based on Conventional Playing Cards

The game of the present invention is perhaps most easily implemented using a conventional deck of playing cards, although these cards may be configured as a deck of cards having fewer or greater than fifty-two cards. The present invention will thus be described in this section in the context of conventional playing cards. One of ordinary skill in the art will recognize, however, that a game that falls within the scope of the present invention may be developed using representations of cards other than conventional playing cards.

A conventional deck contains fifty-two cards arranged in four suits: Hearts; Diamonds; Spades; and Clubs. Each suit in a conventional deck contains thirteen cards and consists of an Ace, three face cards (a King, a Queen, a Jack) and nine cards sequentially numbered from Two to Ten.

A typical implementation of the game 20 uses a deck 22a formed by, or derived from, a deck of conventional playing cards. In the following discussion, the suffix "a" when used in reference to the deck 22, cards 24, suits 26, face values 30, and numerical values 32 to identify embodiments particular to the use of twenty-four conventional playing cards or representations of conventional playing cards; the suffix "a" is not used in the drawing.

A common implementation of the game 20 would thus use a deck 22a that employs six cards 24a (Aces, Kings, Queens, Jacks, Tens, and Nines) for each of four suits 26a (Hearts, Diamonds, Spades, Clubs). A twenty-four card deck is considered a practical if not theoretical minimum but is not necessarily an optimum number of cards.

Typically, using the exemplary deck 22a, up to six players will play the game 20, and each player is dealt four cards 24a of the deck 22a. In this case, a minimum of twenty-four of the cards 24 in a conventional deck must be used. The size of the deck 22 may be increased as necessary to increase the possible number of point combinations, as will be described below, and in any event should ensure that each player is dealt a hand 28 containing the minimum number of cards 24.

For casino environments, perhaps an optimum number of cards is thirty-six for seven players. With thirty-six cards, the Six, Seven, and Eight cards are used in addition to the Nine, Ten, Jack, Queen, King, and Ace cards. As will be discussed in further detail below, this combination of thirty-six cards allows all numerical point totals from eleven to forty-one to be obtained, with a gap between the score of forty-one obtained by a number of hands and the score of forty-four obtained by four Aces. For simplicity, the exemplary deck 22a comprising twenty-four cards will be discussed in detail below.

With the exemplary deck 22a comprising twenty-four cards 24a, the cards 24a are typically assigned the following point values 32a; Aces=eleven points; Kings=ten points; Queens=ten points; Jacks=ten points; Nines=nine points; and Eights=eight points. These point value assignments are arbitrary, but the assignments just described will be generally familiar to players familiar with other card games, such as Blackjack. Of course, the point values 32a of the Nine and Eight cards are clearly related to the face values 30a of these cards. If additional number cards, such as the Six, Seven, and Eight cards, are used, their point values will normally correspond to their face value.

A hierarchy of suits 26 and face values of cards 24 is also determined for each particular deck 22. For the deck 22a comprising the highest six cards of each suit of a conventional deck, the hierarchy of suits 26a may be arbitrarily determined such that Hearts are the highest, Diamonds are next, followed by Spades, with Clubs being lowest. For the deck 22a containing twenty-four cards, the face values 30a of the cards 24a are arranged with Aces being highest, followed in order by Kings, Queens, Jacks, Tens, and Nines. These hierarchies, especially the hierarchy of suits 26a, are also arbitrary, but the hierarchy of the face values 30a of the cards 24a will be recognizable to the average card player.

Given the deck 22a constructed as described above, a typical minimum requirement for determining the total value of a hand 28 is that the cards be: (a) "of a kind"; or (b) of the same suit. Cards 24 are "of a kind" when they have the same face values 30. Thus, the total value of two, three, or four Eights would be added together; as an example, the total value of a hand 28 containing three Eights would be twenty-four. When cards 24a in a hand 28 are of the same suit 26a, the point value 32a of two, three, or four cards of the same suit are added together. For example, if a particular hand 28 contains the Eight, Nine, Jack, and King of Spades, the total value of that hand 28 will be thirty-seven.

Other minimum requirements for determining total values could optionally be adopted for a particular version of a game 20 or deck 22. For the exemplary deck 22a, another requirement may state that total value of a particular hand 28 containing two pairs (each pair being two "of a kind") is equal to the sum of the point values 32a of the cards 24a forming the highest pair. Accordingly, if a hand 28 contains two Eights and two Jacks, the total value of that hand 28 would be twenty.

Another optional minimum requirement for calculating the total value could be that cards 24a in the same suit 26a be consecutive or form a "straight". Under this rule, the total value of a hand 28 containing an Eight, a Ten, a Queen, and an Ace of any one suit would be zero. The total value of a hand containing an Eight, Nine, and Ten of a given suit would, however, be twentyseven.

In a situation where a number of players are playing against each other, the total values of all of the hands 28 are calculated. The player with the hand 28 having the highest total value wins the game. If two or more players have hands 28 with the same total value, a tie exists. A tie is broken by comparing the subordinate characteristics of the cards 24a forming the tying hands 28 based on the hierarchies described above with reference to the deck 22a.

The face values 30a of the cards 24a may be used to break ties by awarding the win to the hand having the card with the highest face value. If the highest cards in both hands have the same face value, the next highest cards in succession are compared to break the tie.

For example, a hand with a total value of thirty points based on adding the point values of three Kings will defeat a hand with a total value of thirty points based on adding the point values of three Jacks. Similarly, a hand with a total value of twenty points based on adding the point values of a King and a Ten will defeat a hand with a total value of twenty points based on adding the point values of a Queen and a Jack. And if a first hand contains an Ace, a King, and a Jack of one suit while a second hand contains an Ace, a King, and a Ten of another suit, the first hand will prevail because the Jack has a higher value than a Ten.

The suits 26a may be used to break ties by awarding the win to the hand formed of cards of the highest suit. For example, a hand with a total value of thirty points based on adding the point values of the Ten, Jack, and Queen of Hearts will defeat a hand comprising the Ten, Jack, and Queen of any other suit.

These subordinate characteristics themselves can be arranged in a hierarchy that determines how ties are broken. In the exemplary deck 22a, the suits 26a can be assigned a higher value than the face value 30a when breaking ties. For example, a hand having a point value of thirty points obtained by adding the Jack of Hearts, Jack of Spades, and Jack of Clubs will defeat a hand having a point value of thirty points obtained by adding the Jack, Queen, and King of Diamonds.

Another example of how subordinate characteristics of the cards 24a can be compared to break ties is to give higher priority to face cards (King, Queen, Jack) than to numerical cards (Ten, Nine). The point value of the Nine card reduces its contribution to the total value of a given hand. However, a Ten card has the same point value as a face card. As an exception to the just-stated possible rule whereby suits 26a take precedent over face value 30a, a hand having a total value of thirty points obtained by adding the point values of a Jack, Queen, and King of the same suit will defeat a hand having a total value of thirty points obtained by adding the point values of three Ten cards.

The tie-breaking schemes described herein are completely arbitrary but fit with the general preconceptions that most card players have of the value of cards in a standard deck. However, changes to these tie-breaking schemes can be made within the scope of a game of the present invention. For example, one might decide that the "of a kind" concept takes precedence over the hierarchy of suits and award a tie between a first hand containing three Tens and a second hand containing the Jack, Queen, and King of the same suit to the first hand.

If the game is played under rules where the winning player is the player with the highest cumulative point total over a number of hands, tie-breaking schemes may not be necessary; while ties are fairly likely within one hand, it is less likely that ties between players will result after multiple hands. The greater the number of hands included in the cumulative point total, the less likely that ties will occur. And if a tie does occur, the tie can be broken by playing additional "playoff" hands until one player wins a playoff game.

The game 20 of the present invention may perhaps be optimized when using the exemplary deck 22a as described in this section because special significance is given to Aces. First, to the Applicant's knowledge, a game 20 of the present invention using the deck 22a as described above is the only game in which the top hand consists of four Aces. According to the rules described above, the total value of a hand consisting of four Aces is forty-four points. The next highest hand has a total value of forty-one points.

Players normally think of Aces as being the highest card in conventional card games such as Blackjack and Poker; however, to the Applicant's knowledge, the highest winning hand in these other games does not consist of four Aces. This feature of the game 20a using the deck 22a will thus yield enhanced appeal for players and, especially in a casino setting, provides significant marketing possibilities.

Another possibility, especially in a casino setting, is to award a bonus in terms of either points or money for certain hands that are more difficult to obtain. If the player is dealt a bonus hand, the casino would pay that player a predetermined amount of money. The bonuses may further be arranged in levels. For example, a run of cards may be given a bonus, four of a kind may be given a double bonus, and four Aces may be given a triple bonus. The use of bonus allows the house to participate and raise the entertainment value even when the dealer does not participate. The bonus system may be tied into or entirely separate from the point system described above.

Referring now for a moment to the Point Table set forth below, this table summarizes how winners are determined among all of the sets or hands that can possibly be obtained using the exemplary deck 22a described herein containing twenty-four cards. The sets are listed in Table A in order, with the highest hand at the top of the table and lowest hand having a total value at the bottom of the table. This order is dictated by point totals and the hierarchy of face values. Cards that do not meet the minimum requirements described above have no value and are not in the Point Table.

POINT TABLE

| Set # | Cards Held | Total Value | Suit Match? | Suit Breaks Ties? | Bonus |
|---|---|---|---|---|---|
| 1. | A-A-A-A | 44 | n | n/a | * |
| 2. | A-K-Q-J | 41 | y | y | * |
| 3. | A-K-Q-10 | 41 | y | y | * |
| 4. | A-K-J-10 | 41 | y | y | * |
| 5. | A-Q-J-10 | 41 | y | y | * |
| 6. | K-K-K-K | 40 | n | n/a | * |
| 7. | Q-Q-Q-Q | 40 | n | n/a | * |
| 8. | J-J-J-J | 40 | n | n/a | * |
| 9. | K-Q-J-10 | 40 | y | y | * |
| 10. | A-K-Q-9 | 40 | y | y | * |
| 11. | A-K-J-9 | 40 | y | y | * |
| 12. | A-Q-J-9 | 40 | y | y | * |
| 13. | A-K-10-9 | 40 | y | y | * |
| 14. | A-Q-10-9 | 40 | y | y | * |
| 15. | A-J-10-9 | 40 | y | y | * |
| 16. | 10-10-10-10 | 40 | n | n/a | * |
| 17. | K-Q-J-9 | 39 | y | y | |
| 18. | K-Q-10-9 | 39 | y | y | |
| 19. | K-J-10-9 | 39 | y | y | |
| 20. | Q-J-10-9 | 39 | y | y | |
| 21. | 9-9-9-9 | 36 | n | n/a | |
| 22. | A-A-A | 33 | n | n/a | |
| 23. | A-K-Q | 31 | y | y | |
| 24. | A-K-J | 31 | y | y | |
| 25. | A-K-10 | 31 | y | y | |
| 26. | A-Q-J | 31 | y | y | |
| 27. | A-Q-10 | 31 | y | y | |
| 28. | A-J-10 | 31 | y | y | |

-continued

POINT TABLE

| Set # | Cards Held | Total Value | Suit Match? | Suit Breaks Ties? | Bonus |
|---|---|---|---|---|---|
| 29. | K-K-K | 30 | n | n/a | |
| 30. | Q-Q-Q | 30 | n | n/a | |
| 31. | K-Q-J | 30 | n | n/a | |
| 32. | J-J-J | 30 | n | n/a | |
| 33. | K-Q-10 | 30 | y | y | |
| 34. | K-J-10 | 30 | y | y | |
| 35. | Q-J-10 | 30 | y | y | |
| 36. | 10-10-10 | 30 | n | n/a | |
| 37. | A-K-9 | 30 | y | y | |
| 38. | A-Q-9 | 30 | y | y | |
| 39. | A-J-9 | 30 | y | y | |
| 40. | A-10-9 | 30 | y | y | |
| 41. | K-Q-9 | 29 | y | y | |
| 42. | K-J-9 | 29 | y | y | |
| 43. | K-10-9 | 29 | y | y | |
| 44. | Q-J-9 | 29 | y | y | |
| 45. | Q-10-9 | 29 | y | y | |
| 46. | J-10-9 | 29 | y | y | |
| 47. | 9-9-9 | 27 | n | n/a | |
| 48. | A-A | 22 | n | y | |
| 49. | A-K | 21 | y | y | |
| 50. | A-Q | 21 | y | y | |
| 51. | A-J | 21 | y | y | |
| 52. | A-10 | 21 | y | y | |
| 53. | K-K | 20 | n | y | |
| 54. | K-Q | 20 | y | y | |
| 55. | Q-Q | 20 | n | y | |
| 56. | K-J | 20 | y | y | |
| 57. | Q-J | 20 | y | y | |
| 58. | J-J | 20 | n | y | |
| 59. | K-10 | 20 | y | y | |
| 60. | Q-10 | 20 | y | y | |
| 61. | J-10 | 20 | y | y | |
| 62. | 10-10 | 20 | n | y | |
| 63. | A-9 | 20 | y | y | |
| 64. | K-9 | 19 | y | y | |
| 65. | Q-9 | 19 | y | y | |
| 66. | J-9 | 19 | y | y | |
| 67. | 10-9 | 19 | y | y | |
| 68. | 9-9 | 18 | n | y | |
| 69. | A | 11 | n | y | |

The first column simply identifies the set types that can be created by the deck 22. The second column identifies the cards that are combined to obtained each of these sets. Except for Sets #1, #6, #7, and #16 in the Point Table, all other sets can result from multiple combinations of the representations of cards or cards. The third column contains the total values for each set. The fourth column contains a "y" or "n", where the "y" indicates that the cards in each set must be of the same suit and the "n" indicates that the cards need not be of the same suit.

The fifth column contains a "y" or an "n/a", where the "y" indicates, where a tie can occur within a given set, that the higher suit takes precedence. The "n/a" in the fifth column indicates those situations where no tie can exist within a given set.

The sixth column indicates hands where a bonus is most likely to be awarded. Whether to award a bonus, what hands deserve a bonus, and the size of the bonus are all completely arbitrary and can differ in different environments or establishments.

Figure 3:
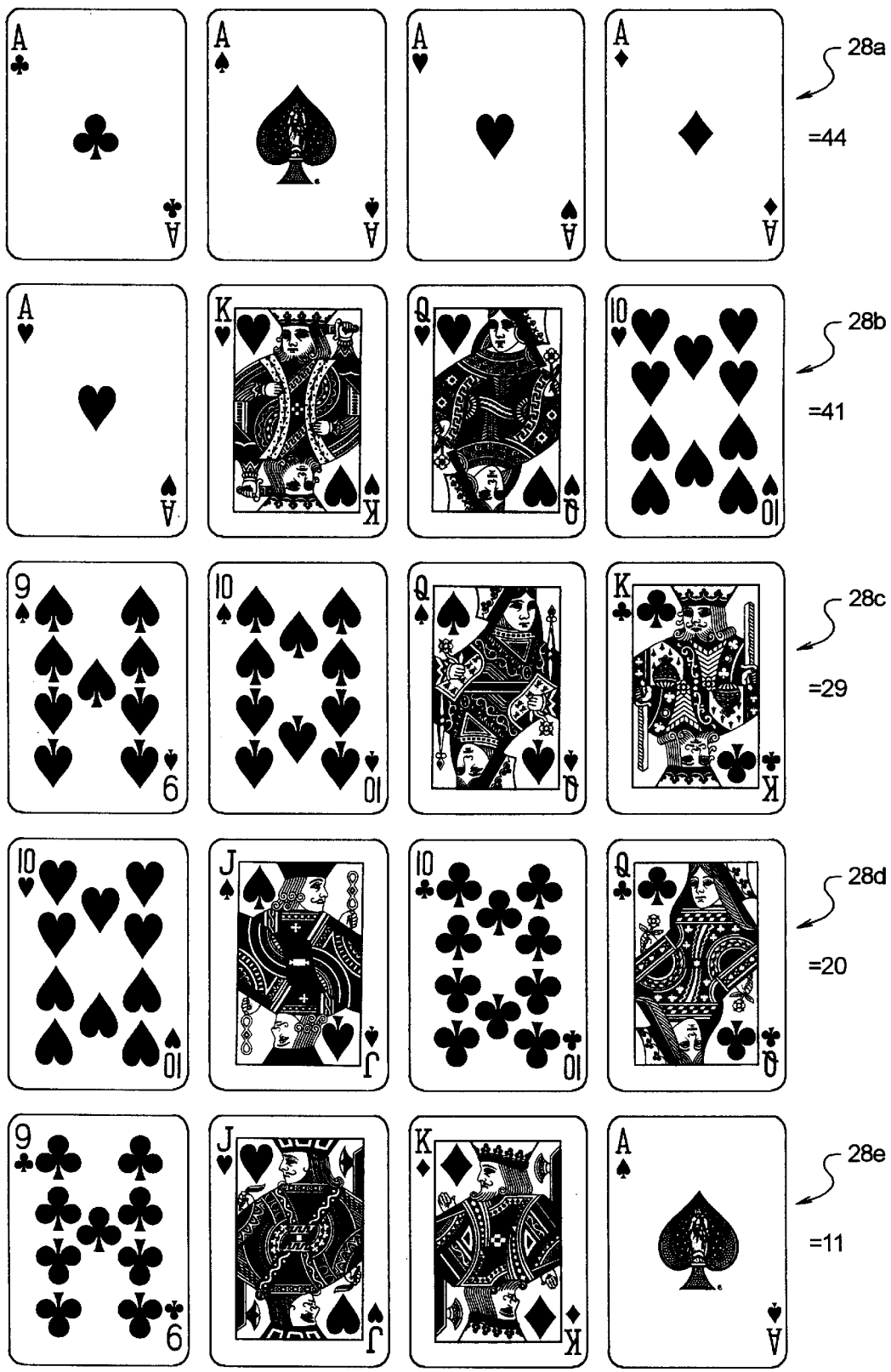
FIG. 3 depicts representations of playing cards illustrating five different sets or hands, with associated total values, that may be obtained when implementing the principles of the present invention using conventional playing cards.

Referring now to FIG. 3, depicted therein are three exemplary hands 28a, 28b, 28c, 28d, 28e, and 28f, along with the total values of each of these hands. These hands 28a–f correspond to Sets #1, #3, #45, #61, and #69, respectively, in the Point Table set forth above.

As discussed above, perhaps an optimum deck 22 employs thirty-six cards and comprises the highest nine cards of each suit in a conventional deck. The Point Table set forth above would contain the same entries listed above but would also contain entries for combinations including the Six, Seven, and Eight cards. These additional cards would result in the possibility of obtaining any point value between eleven and forty-one, which may be desirable in a casino setting. One of ordinary skill in the art would be able to develop an expanded point table including these additional cards given the Point Table set forth above and the foregoing discussion of the implementation using the twenty-four card deck 22a.

IV. Set Creation

In any implementation of a game 20 of the present invention, the sets can be formed by many different methods. Most of these methods are independent of the particular physical structure for representing the cards 24 of the deck 22.

Typically, the representations of cards will be distributed to players sequentially one representation of a card at a time. The player will accumulate representations of cards in this manner until the player possesses a set containing the desired number of representations of cards.

In the context of a card game as described above with reference to the deck 22a, the cards 24a will typically be dealt face down to the players until each player possesses a hand 28 comprising four cards 24a. As an alternative, one or more cards can be dealt face up in a manner similar to Blackjack or certain versions of Poker. The players thus have information about each others hand when deciding how and whether to stay in a hand.

In the context of the machine 40, the sets can be simultaneously or sequentially created for multiple players. A single player playing against the machine can receive a set all at once or sequentially. Typically, at least one player will have access to an initiate button which will be depressed to create sets for all players at once. Providing all players with an initiate button allows each player to determine when the machine 40 will proceed with sequentially distributing representations of cards to remaining players, which may be an asset in a gambling environment.

V. Gambling Implementations

In any of the forms described above, the game 20 of the present invention may be implemented as a gambling game in which money is wagered and won or lost. A number of versions of the game 20 optimized for gambling will be described in this section.

A. Casino Card Game

When played as a gambling game using a physical deck 22 of playing cards 24 arranged in suits 26 and defining face values 30 and point values 32, the game 20 may implemented in a casino setting in two basic versions. In particular, casinos will typically implement the game 20 with the services of a non-participating or participating dealer. The game 20 will be described below in the context of a casino card game using the deck 22a described above.

i. Non-particiDating dealer

If the dealer is non-participating, the game 20 is played between six independent competing players. Initially, the dealer shuffles the deck, and each player places a wager as an "ante" before being dealt any cards 24a. The dealer then deals each player in sequence in a predetermined direction around the table a predetermined number of cards 24a. Normally, two cards will be dealt after the initial wager, at which point the players have the opportunity to place a second, additional, wager. The third card is then dealt to each player, after which the players have the opportunity to place a third, additional, wager. In some implementations, it would be possible for players to place yet a third additional wager after the fourth card is dealt.

Successive players may have the option of meeting the second or third wagers or even to raise the wager. If a player does not meet a wager or the raise, that player is no longer in the game (often referred to as folding) and any wagers made by that player to that point are forfeited to the pool and go to the eventual winner.

After the fourth card is dealt, the winner will be determined. Normally, the winner will take the entire pot created through the wagering process, although other distribution schemes may be agreed upon in advance. In some implementations, a tie may exist, in which the pot is distributed equally among the tying players. When the dealer is non-competing, the casino takes a percentage of winnings, and the dealer simply provides the service of dealing cards and determining winners.

The Point Table set forth above is optimized for a card game implementation of the present invention in which the dealer is not a participant. In this case, the dealer or house will take a percentage of the money wagered as compensation.

ii. Participating dealer

If the dealer is participating, the dealer shuffles the cards, and the players and the dealer place the initial wager or ante. The dealer then deals two cards to each player, including the dealer, in succession around the table. A first additional wager is then solicited from the players after they have had the opportunity to review the first two cards dealt. The third card is then dealt to each player, after which a second additional wager is solicited from the players. The fourth card is then dealt, and, optionally, the players may be provided with the opportunity to place a third additional wager. The winner is then determined after the fourth card has been dealt and the wagering process is complete.

In the case of a participating dealer, the players will typically be playing against the dealer or "the house" in a manner similar to Blackjack. Accordingly, the players wager against the dealer and need not respond to other player's bets as in the case of a non-participating dealer.

Normally, in any numerical tie between a player and a participating dealer, the tie-breaking rules are not used and the pot is simply split between the player and the dealer. The dealer may, however, be given an advantage in scoring. For example, ties may go to the winner, or the tie-breaking rules may favor the dealer in tie situations.

B. Slot Machine Game

As generally discussed above, the game 20 of the present invention may be embodied in a machine 40, and this machine 40 may be configured with an optional coin slot 50 and payout tray 52. In this configuration, operation of the machine requires the user to insert money into the coin slot 50 before operating the initiate button 44. If the player wins a hand the machine dispenses winnings through the payout tray 52.

The machine 40 can be configured to create a hand 28 in the viewing area 42 instantly or through a number of successive operations of the initiate button 44. Optionally, the player can be invited to bet as each representation of a card is created or to fold by pressing a stop button 54.

In a machine setting with the player playing against the machine, whether and how much a player wins can be calculated based on the total value of each hand. For example, in a first, lowest, range of total values, the player may win nothing. In a second range, the player may win a fraction of the money wagered. In third range, the player may receive the wager as a payout. In a fourth range, the player may receive greater than the wager, possibly in proportion to the total value of the hand. In one likely scenario, the machine 40 is programmed to operated using the deck 22a described above, and a "jackpot" of four Aces would result in the highest possible payout. A bonus system may also be implemented in the context of a slot machine.

The initiate and stop buttons 44 and 54 may take the form of a lever in a mechanical game or a conventional momentary switch in a video game.

C. Additional Gambling Considerations

Commercial gambling activities are typically highly regulated. These regulation may dictate at least in part the particular rules of play in a particular regulatory jurisdiction. One of ordinary skill in the art will thus recognize that the details of implementation of the game 20 will vary depending upon the jurisdiction.

VI. Summary

Given the foregoing, it should be clear to one of ordinary skill in the art that the game of the present invention may be embodied or implemented in many different forms. The present invention is of particular significance, however, when implemented using a deck of cards derived from a conventional deck of playing cards. The deck of cards may be a physical deck of cards or graphically represented by a mechanical or electronic machine. The scope of the present invention should thus be determined by the claims attached hereto and not the foregoing detailed description.

What is claimed is:

1. A method of playing a game of chance, comprising the steps of: providing a plurality of representations of cards:

assigning each representation of a card a face value selected from the group consisting of Aces, Kings, Queens, Jacks, and one of a plurality of numbers of at most ten;

assigning each representation of a card a first subordinate characteristic comprising a suit selected from among the group consisting of Hearts, Diamonds, Spades, and Clubs; and a second subordinate characteristic comprising a point value, where the point value of a representation of a card having a face value of Ace is eleven, the point value of representations of cards having a face value of King, Queen, or Jack is ten, and 7the point value of representations of cards having a face value represented by numbers is the number;

establishing first, second, and third minimum requirements, where the first minimum requirement is based on the face values of a plurality of representations of cards;

the second minimum requirement is based on at least one of the subordinate characteristics of a plurality of representations of cards, and the third minimum requirement is that the face value of at least one of the representations of the cards is an Ace;

randomly distributing a set of four representations of cards to at least one player;

calculating a total value for the set based on the point values of the representations of cards in the set, where the total value for the set is the sum of the point values of representations of cards in the set meeting one of the first, second, and third minimum requirements, and zero if the representations of the cards in the set do not meet the first and second minimum requirements; and determining whether the at least one player wins based on the total value of the set.

2. A method as recited in claim 1, in which:

the step of defining at least one subordinate characteristic further comprises the step of defining a hierarchy of the selected subordinate characteristic; and the step of determining whether the at least one player wins is further based on the subordinate characteristics associated with at least a portion of the representations of cards in the set, and the hierarchy of subordinate characteristics.

3. A method as recited in claim 1, in which a plurality of sets of representations of cards are distributed to a plurality of players, further comprising the step of determining at least one winning player by comparing the total values of the plurality of sets.

4. A method as recited in claim 3, in which:

the step of defining at least one subordinate characteristic further comprises the step of defining a hierarchy of the selected subordinate characteristic; and further comprising the step of breaking ties between players having the sets with equal total values by comparing the subordinate characteristics associated with at least a portion of the representations of cards in the set based on the hierarchy of the selected subordinate characteristic.

5. A method as recited in claim 1, further comprising the steps of:

identifying certain predetermined sets of representations of cards as bonus sets; and awarding a bonus to players having sets containing representations of cards matching the representations of cards in the bonus sets.

6. A method as recited in claim 3, in which the step of determining which player wins further comprises the steps of:

identifying a hierarchy of suits; and breaking ties between matching sets containing representations of cards having the same face value based on the hierarchy of suits.

7. A method as recited in claim 1, in which the step of distributing the representations of cards comprises the step of providing a machine having a viewing area in which the sets of representations of cards are represented.

\* \* \* \* \*